US010424274B2

(12) United States Patent
Glen

(10) Patent No.: US 10,424,274 B2
(45) Date of Patent: Sep. 24, 2019

(54) METHOD AND APPARATUS FOR PROVIDING TEMPORAL IMAGE PROCESSING USING MULTI-STREAM FIELD INFORMATION

(75) Inventor: David I.J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 442 days.

(21) Appl. No.: 12/954,046

(22) Filed: Nov. 24, 2010

(65) Prior Publication Data

US 2012/0127367 A1 May 24, 2012

(51) Int. Cl.
*H04N 5/00* (2011.01)
*G09G 5/393* (2006.01)

(52) U.S. Cl.
CPC ......... *G09G 5/393* (2013.01); *G09G 2310/04* (2013.01); *G09G 2320/103* (2013.01); *G09G 2330/021* (2013.01)

(58) Field of Classification Search
CPC ......... G09G 2310/04; G09G 2320/103; G09G 2330/021; G09G 5/393
USPC ....................................... 375/240; 348/42–60
See application file for complete search history.

(56) References Cited

U.S. PATENT DOCUMENTS 5,572,691 A * 11/1996 Koudmani ............. H04N 5/907 345/539
7,098,939 B2 * 8/2006 Hamamura ........ H04N 1/00453 348/51
7,876,350 B2 * 1/2011 Shin ........................ G09G 3/003 345/87
2002/0168007 A1 * 11/2002 Lee .......................... 375/240.03
2004/0027452 A1 2/2004 Yun et al.
2006/0045182 A1 * 3/2006 Yokose ................ H04N 19/197 375/240.12
2008/0037635 A1 * 2/2008 Li ........................ H04N 19/176 375/240.12
2009/0142041 A1 * 6/2009 Nagasawa ............. H04N 19/70 348/42
2009/0220213 A1 9/2009 Ogawa et al.
2009/0300676 A1 * 12/2009 Harter, Jr. .............. H04N 5/782 725/35

(Continued)

OTHER PUBLICATIONS

International Search Report and Written Opinion from Canadian Patent Office; International Application No. PCT/CA2010/002075; dated Mar. 14, 2011.

(Continued)

*Primary Examiner* — Md N Haque
(74) *Attorney, Agent, or Firm* — Faegre Baker Daniels LLP

(57) ABSTRACT

An apparatus and method provides temporal image processing by producing, for output on a single link such as a single cable or wireless interface, packet based multi-steam information wherein one stream provides at least frame N information for temporal imaging processing and a second stream that provides frame N−1 information for the same display, such as a current frame and a previous frame or a current frame and next frame. The method and apparatus also outputs the packet based multi-stream information and sends it for the same display for use by the same display so that the receiving display may perform temporal image processing using the multi-stream multi-frame information sent with a single link.

18 Claims, 4 Drawing Sheets

(56) References Cited

U.S. PATENT DOCUMENTS

| | | | | |
|---|---|---|---|---|
| 2010/0037283 | A1* | 2/2010 | Zhu | G06F 3/14 725/135 |
| 2010/0238355 | A1* | 9/2010 | Blume | 348/607 |
| 2011/0012990 | A1 | 1/2011 | Broberg | |
| 2011/0109742 | A1* | 5/2011 | Laganiere | H04N 7/185 348/143 |
| 2011/0157302 | A1 | 6/2011 | Glen | |
| 2011/0164706 | A1* | 7/2011 | Yokokawa et al. | 375/340 |
| 2011/0228062 | A1 | 9/2011 | MacNaughton et al. | |
| 2012/0008914 | A1 | 1/2012 | Sasaki et al. | |
| 2012/0062711 | A1* | 3/2012 | Ikeda | G11B 20/1251 348/51 |

OTHER PUBLICATIONS

U.S. Patent and Trademark Office; Final Rejection; U.S. Appl. No. 12/695,783; dated Nov. 5, 2014.

U.S. Patent and Trademark Office; Non-Final Rejection; U.S. Appl. No. 12/695,783; dated Apr. 9, 2014.

U.S. Patent and Trademark Office; Final Rejection; U.S. Appl. No. 12/695,783; dated Feb. 6, 2013.

U.S. Patent and Trademark Office; Non-Final Rejection; U.S. Appl. No. 12/695,783; dated Jul. 19, 2012.

Brennesholtz, Matt; 3D Professionals (and Consumers) Get New Options; www.insightmedia.info; Dec. 17, 2008.

Draft DisplayPort Specification, Topology Management; pp. 1-65; ~Jul. 2009.

Draft DisplayPort Specification, Multistream Transport; pp. 1-26; ~Jul. 2009.

Draft DisplayPort Specification Presentation, DP1.2 Sideband Messaging Syntax; Jul. 1, 2009.

Proposed VESA DisplayPort Standard; Version 1, Revision 2; Oct. 14, 2009.

DisplayPort Slides; Intel Developer Form; ~Sep. 2008.

DisplayPort v1.2 Technical Proposal Overview; VESA Systems Committee; pp. 1-12; Jul. 9, 2008.

Slide DisplayPort Beyond 1.1a; ~Sep. 2008.

Draft DisplayPort Specification Sections 2.3-2.3.5.6 regarding multistreaming; ~Sep. 2008.

* cited by examiner

METHOD AND APPARATUS FOR PROVIDING TEMPORAL IMAGE PROCESSING USING MULTI-STREAM FIELD INFORMATION

CROSS-REFERENCE TO RELATED APPLICATION

This application is related to co-pending application having Ser. No. 12/695,783, filed on Jan. 28, 2010, having inventor David Glen, titled "THREE-DIMENSIONAL VIDEO DISPLAY SYSTEM WITH MULTI-STREAM SENDING/RECEIVING OPERATION", owned by instant assignee which claims priority from and the benefit of U.S. Provisional Patent Application No. 61/291,080, filed Dec. 30, 2009, entitled "THREE-DIMENSIONAL VIDEO DISPLAY SYSTEM WITH MULTI-STREAM SENDING/RECEIVING", which is hereby incorporated herein by reference in its entirety.

BACKGROUND OF THE DISCLOSURE

The disclosure relates generally to display systems that perform temporal processing, such as, but not limited to, video display systems.

The DisplayPort 1.2 standard, amongst others, is a digital interface to connect with monitors (displays). The DisplayPort 1.2 standard enables multi-streaming of different video streams for multiple monitors so that a hub or computer may provide differing display streams to differing monitors. As such, a single cable or wireless interface may be employed.

DisplayPort 1.2 enables multiple independent display streams that are interleaved. As such, a few pixels for each monitor may be interleaved in packets that may be generated by an encoder. Also, one display may be a branch device or hub that receives streams for multiple displays (e.g., sink/logical branch), such a sink typically processes one or more streams and passes through the rest of the streams to other sinks/devices. There is identification data to identify subcomponents of a packet so that bytes from a packet may be identified to correspond to the same stream and hence the same monitor. One packet can include pixels for multiple displays. One display (e.g., video sink device) may also be set up as a logical branch device that receives multiple streams and displays multiple streams as separate streaming video streams, each having different images. A unique address is assigned to each logical sink in the logical branch device and a common global universal ID (GUID) is used for the logical sinks. However, displaying separate streaming video streams does not facilitate temporal image processing.

Display devices frequently implement various forms of temporal image processing in order to improve the visual quality of the displayed image. Some examples are liquid crystal display (LCD) overdrive, motion blur reduction and motion compensated frame rate conversion. Temporal image processing requires input of two or more frames or fields of the image sequence, normally from temporally sequential frames. For example, the current and previous frame or the current, previous and next frames, and so on.

Display systems that implement temporal image processing typically have an associated memory system for storing the current input frame N from the display source device as it comes into the display system, such as a display receiving the current input frame and other frame information. This memory can then be used later to retrieve the same stored image later in time, when it is then referred to as previous frame N−1. For example, initially frame N may come into the display system and is stored in memory. In the next frame period the display system will relabel the previous current frame N to N−1, also the new current frame will be labeled frame N. Thus, it has pixels from frame N and N−1 at the same time, and may perform temporal image processing.

It would be desirable to provide an improved display system that performed temporal processing.

BRIEF DESCRIPTION OF THE DRAWINGS

The invention will be more readily understood in view of the following description when accompanied by the below figures and wherein like reference numerals represent like elements, wherein.

BRIEF DESCRIPTION OF THE PREFERRED EMBODIMENT

Figure 1:
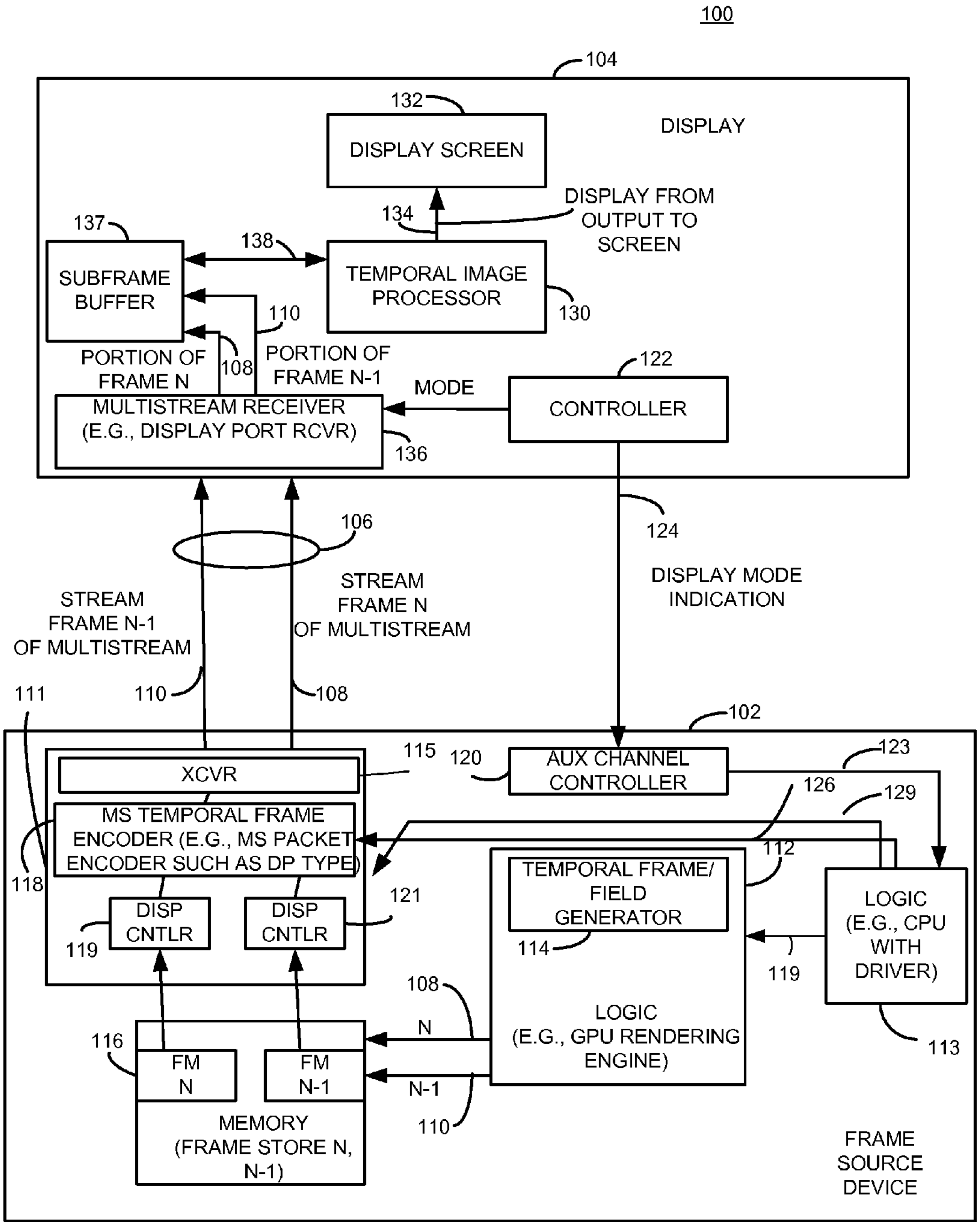
FIG. 1 illustrates one example of an apparatus for providing temporal image processing in accordance with one example set forth in the disclosure.

Briefly, an apparatus and method provides temporal image processing by producing, for output on a single link such as a single cable or wireless interface, packet based multi-steam information wherein one stream provides frame N information for temporal imaging processing and a second stream provides frame N−1 information for the same display, such as a current frame and a previous frame or a current frame and next frame. As used herein, the term "frame" may also include "field" since the operation may be similar whether the information is provided on a frame basis or a field basis. The method and apparatus also outputs the packet based multi-stream frame information and sends it to the same display for use by the same display so that the receiving display may perform temporal image processing using the multi-stream information sent with a single link. Producing the packet based multi-stream information includes producing a sequence of temporally related frames and generating from the sequence, the packet based multi-stream information wherein the one stream provides the frame N information for temporal imaging processing by the display and the second stream provides frame N−1 information for the same display. In one embodiment, the system does not require the storing and retrieving of previous full frames in the display device.

The apparatus and method may also provide switching between display modes so that a display that may incorporate temporal image processing capabilities may switch between such a mode and a mode that does not employ temporal imaging processing. The image source device that sends the multi-stream information that contains the differing frame information in a multi-stream format may be notified of the capability of the sink device such as the display and suitably switch into a temporal image processing mode to provide the multi-streams with differing temporal frame information for the display. As such, the display may switch from a non-multi-stream mode to a multi-stream mode and the frame sending device determines the change in mode and provides the temporal frame information as a multi-stream information.

In another example, the method and apparatus sends the same frame N information multiple times as packet based multi-stream information to the display to facilitate temporal image processing by the display so that that display need not have full frame buffers to store a full frame N for example. By way of example, the frame sending device sends a frame in the current frame period and then again as in a next frame period, thereby sending a frame multiple times so the display can have a smaller frame store or sub-frame buffer to process frame information for temporal image processing.

Among other advantages, a multi-stream approach is used for providing temporal frame information for temporal image processing. Also, when sending repeated frame information, the repeated sending of the frame N information allows the receiving display to avoid storing entire frames. In addition, multi-mode display functionality may be incorporated to allow dynamic mode changes between a display mode that utilizes temporal image processing and a mode that does not use temporal image processing. A type of plug and play mechanism may be employed so that when a display is linked with a frame sending device, that display mode indication information is provided by the display indicating the display mode capability so that the frame sending device may recognize that multi-stream temporal frame information should be sent over a single link to the display. Other advantages will be recognized by those of ordinary skill in the art.

FIG. 1 illustrates one example of an apparatus 100 for providing temporal image processing that employs a frame source device 102 and a display 104. In this example, the frame source device 102 is in communication with the display 104 through a single link 106 wherein the single link is a packet based multi-stream link such as a DisplayPort compliant link. However, any suitable single link and packet based multi-stream link may be employed. The apparatus may be, but is not limited to for example, a laptop computer, high definition television unit, a combination of a cable card or cable box and a monitor, desktop computer, handheld device or any other suitable device. The frame source device 102 provides packet based multi-stream information that provides frame (field) information in a multi-stream format for multiple different temporally related frames (fields). In one example, one of the streams provides current frame N information 108 and another stream being sent at the same time as the first stream provides frame N−1 information shown as information 110 for temporal image processing by the display 104. The streams are effectively sent synchronized such that minimal buffering is needed to perform temporal processing by the display 104. The first and second streams are for the same display 104 and the display 104 has logic (e.g., programmed processor, discrete circuitry or any suitable logic) with temporal image processing capabilities.

In this example, the frame source device 102 includes logic such as a processor 112 (e.g. a graphics processing unit), a processor 113 (e.g., central processing unit) and a temporal frame multi-stream generator 111. Any other suitable logic may also be used whether hardware, firmware or combination of processor and executing software. The temporal frame multi-stream generator 111 produces for output on the single link 106, packet based multi-stream information that includes a first stream 108 that provides at least frame N information for temporal image processing along with another multi-stream that is sent with the first multi-stream to provide at least frame N−1 information for the same display. As used herein, it will be understood that N can be considered N−1 depending upon the point of reference. The processor 112 includes a temporal frame/field generator 114 that, in this example, is the processor executing code to produce the current frame information N 108 and the stream information for previous frame N−1 110 . Any suitable algorithm may be employed as known in the art to produce the current and previous or subsequent frame information. Producing the packet based multi-stream information may include producing a sequence of temporally related frames by the processor 112. This may be controlled by processor 113 executing a driver application so that the processor 113 serves as a controller to control the functions of hardware circuits. However it will be recognized that processor 112 may also be suitably programmed if desired or the functions may be controlled by any suitable component. In one example. the processor 113 uses control data 119 to generate a current frame 108 and a previous frame 110 as surfaces that are stored in the frame buffer. This may be done by populating control registers in the processor 112.

The processor 113 also controls the temporal frame multi-stream generator 111 to generate from the sequence, the packet based multi-stream information wherein the one stream provides the frame N information for temporal imaging processing by the display and the second stream provides frame N−1 information for the same display. The frame information may include subframes of information that are communicated such as groups of lines of a frame or the entire frame as desired. It will be also recognized that the functional blocks shown in the figures may be suitably combined.

The frame source device 102 also includes memory 116 that serves as a frame or field store for multiple fields or frames. The temporal frame multi-stream generator 111 includes a transceiver 115 compliant with the DisplayPort specification and also includes a multi-stream temporal frame encoder 118. The multi-stream temporal frame encoder 118 produces the multi-stream frame N information for the display 104 as well as the frame N−1 information for the display so that the display may perform suitable temporal image processing. The temporal frame multi-stream generator 111 also includes respective display controllers 119 and 121 that are controlled by the processor 113 via control data 129 to retrieve respective temporal N and N−1 frame information for packing as temporal frame multi-stream information by the multi-stream temporal frame encoder 118 as further described below. The frame source device 102 also includes a mode controller 120 that in this example is an auxiliary channel controller that communicates with a corresponding controller 122 in the display 104 via an auxiliary channel to provide display mode indication information 124 to indicate whether the display 104 is in a temporal image processing mode or non-temporal image processing mode. The controller 120 may be any suitable logic that receives the information and informs processor 113 via data 123 the mode of the display 104.

When a temporal processing mode is set, the processor 113 controls the temporal frame multi-stream generator 111 via control information 126 to enable output of temporal image information via a multi-stream single link when the display is in a temporal image processing mode, or disable the output of temporal field of frame information 108 and 110. It will also be recognized that the function of the controller 120 may be carried out, for example, by the processor 112. The display mode indication information 124 may be communicated, for example, via EDID information through a suitable display communication link, may be DPCD information so that an extension to the EDID protocol or DPCD is carried out to allow temporal processing capability information to be communicated from the display 104 to the frame source device 102 to put the frame source device in a suitable temporal processing information generation mode. The temporal processing mode may not be selected if for example a static screen condition is detected, a low power mode is desired or other condition as desired.

The frame source device 102 may also include a graphic user interface provided by the processor 113 to allow a user to select a multi-stream temporal frame information mode. The processor 113 may also switch from a non-multi-stream capable mode to a multi-stream capable mode in response to user input via the user interface. In this example, the controller 120 determines whether the display 104 has a display mode capability to process temporal frame information provided as multi-stream information. The display mode indication information 124 may be, for example, communicated based on video playback indication from a Blu-Ray player, may be generated based on a query of the display 104 by the frame source device 102, may deselect a temporal processing mode if the display is in a static screen display mode, may deselect temporal processing mode during a low power mode of the source (or display) or based on any other suitable condition. In one example, the processor 113 controls the processor 112 such that the temporal frame/field generator 114 switches from a non-multi-stream mode to a multi-stream mode in response to determining that the display has the display mode capability to process temporal frame information that is provided to the display as multi-stream information. This is done in response to obtaining the display mode indication information 124 indicating that the display is capable of utilizing temporal image information sent over a single link sent as packet based multi-stream information. Alternatively, the switching may be based on a user interface selection done through the frame source image device user interface or based on other conditions as mentioned above. Accordingly switching between modes can be based on one or more of detection of a static screen condition, display content type (high definition vs. lower resolution images) and a power change condition.

In the example where the source or display determines that a static screen condition exists (as known in the art), the source device may switch to sending only one stream to reduce power consumption by the source. Likewise the display may shut down the temporal processing operation to conserve power and simply display the single stream. When normal operation resumes, the source and display may revert back to temporal processing mode. Also if the source 102 enters a low power mode then the temporal processing mode may also be shut off to save power.

The processor 113 may control the temporal frame multi-stream generator 111 to send the same frame information N multiple times as packet based multi-stream information to the display 104 to facilitate temporal image processing by the display 104. The display mode indication information 124 may indicate, for example, that the display 104 is a particular type of display that utilizes a small subframe buffer and hence cannot store an entire frame of information. Given this capability of the display 104, the temporal field generator 114 repeatedly sends the same field or frame information N multiple times. By way of example, the multi-stream single link interface transceiver sends N and N−1 multi-stream information and then as the next set of frame information resends information so that N information is sent multiple times (N in next temporal sequence is not N from previous time slot). The processor 113 is also operative to send different streams of multi-stream video information to different displays via the same multi-stream single link interface transceiver 118 using a DisplayPort 1.2 compliant transceiver. For example, if the display 104 is a type of sink or hub, the multi-stream information may include other streams that are designated for other displays. The display 104 may then forward this information to the other displays if desired. Alternatively, a hub may be interposed between the display 104 and the frame source device 102 to facilitate routing of multi-stream video information for differing displays other than the display 104.

The display 104 may be, for example, a high definition display that includes a processor and in this example, a processor suitably programmed as a temporal image processor 130. The display 104 also includes a display screen 132 that receives display frame information 134 that is the produce of temporal image processing performed as known in the art by the temporal image processor 130. Although not shown the display includes other circuitry as known in the art. The processor 130 may be an existing processor already used for other purposes or may be an additional processor. Also, it will be recognized that the operations described may also be carried out by other types of logic including but not limited to, as ASIC, discrete logic or any suitable combination of hardware/software as desired. In this example, the display 104 includes a corresponding multi-stream receiver 136 such a DisplayPort transceiver that communicates with the multi-stream single link interface 106. Also in this example, the display 104 includes a subframe buffer 137 that stores portions of a frame such as a particular number of lines for example that are received as packet information as stream frame N of stream information 108 and stream information N−1 information of stream 110. This subframe buffer 137 may be optional if suitable buffering is provided by the receiver 136. Accordingly as used herein, a display can be any suitable combination of a display screen and corresponding temporal image processing logic. The logic may be co-located in a same housing as a display screen or may be remote therefrom and the processing operations may be split up across differing integrated circuits or apparatus in any suitable manner.

Temporal image processor 130 is in communication with the subframe buffer via a suitable bus or link 138 as known in the art and can retrieve the portions of the differing temporal frame information to perform temporal image processing operations such as frame rate conversion, motion blur reduction or other suitable temporal image processing operations as known in the art. The display 104 receives, from the single link 106, the packet based multi-stream information that includes the first stream 108 that provides frame N information and the second stream 110 that provides the frame N−1 information. The temporal image processor 130 produces images for output on the display 104 and in particular, the display screen 132, from the packet based multi-stream information 108 and 110. This is done, for example, by temporally processing the frame N information and the frame N−1 information received as multi-stream information. This may be done, for example, without storing the full field or frames and may process the information in real time in this example. The same frame information may be sent multiple times by the frame source device. The frame source device sends frame N in the current frame period and then again as frame N−1 in a next frame period, thereby sending a frame N multiple times so the display can have a smaller frame store or sub-frame buffer to process frame N information for temporal image processing.

In an alternative arrangement, a full frame buffer may be employed in the display so that the same field information need not be sent, if desired. The system that employs a subframe buffer may be more desirable, for example, in a handheld device or a device having smaller buffer stores. In this example, the display 104 stores the second stream N−1 information that include the frame information from the single link in a temporary subframe buffer memory 137 prior to producing the output image information 134 and displaying the images on the display. The display 104 receives the same frame N information multiple times as repeated packet based multi-stream information in this example and uses the repeated packet based multi-stream information to perform temporal processing by, for example, not storing the N information in subframe buffer but receiving the N information multiple times and using it in real time.

Figure 2:
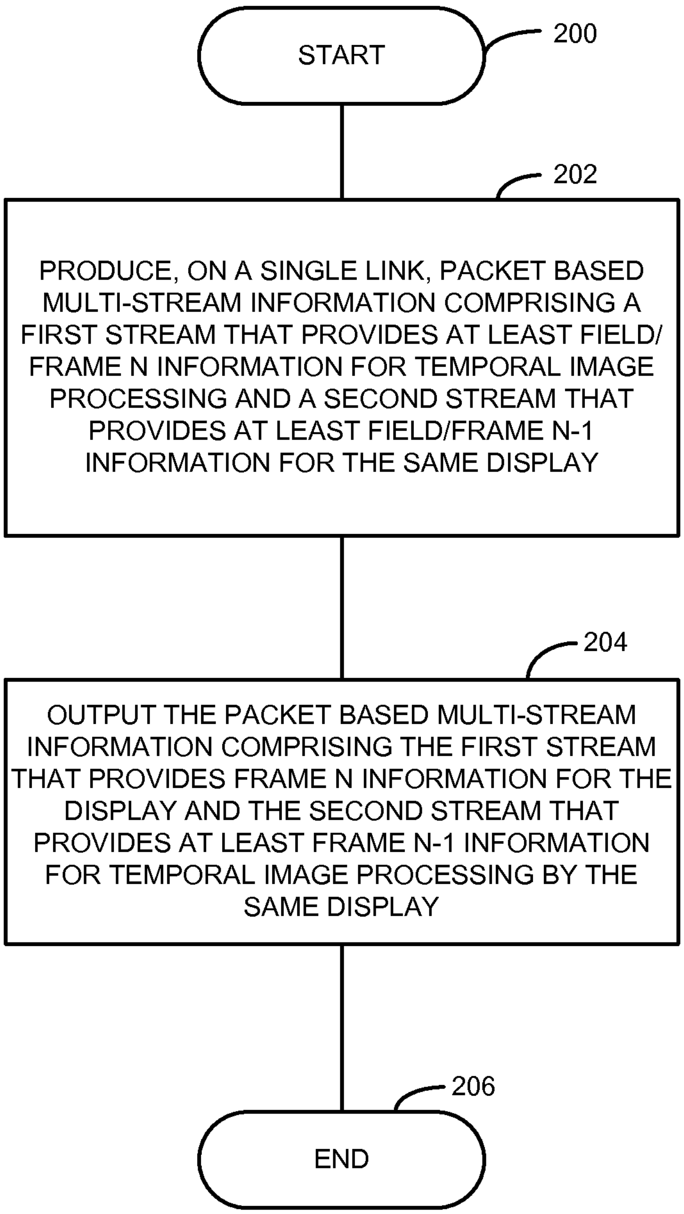
FIG. 2 is a flow chart illustrating one example of a method for providing temporal image processing in accordance with one example set forth in the disclosure.

FIG. 2 illustrates one example of a method for providing temporal image processing from the perspective of the frame source device. Where the mode detection mechanism is utilized, the method may start as shown in block 200 with the frame source device either querying or getting from the display 104, display mode indication information 124 to determine whether a temporal processing mode is desired by the display 104. Alternatively, a user may select, via the frame source device for example, that a temporal image processing mode for the device should be selected. If the temporal image processing mode is detected, or if no multi-mode operation is employed, the method may include, for example, producing temporal frame information for output on the single link 106. This includes, for example, producing packet based multi-stream information compliant with the DisplayPort interface, for example, wherein the multi-stream information includes at least a first stream that provides at least frame N information as well as at least a second stream that provides temporally related information such as at least a frame N−1 information for the same display for temporal image processing by the display. This is shown in block 202. As shown in block 204, the method includes outputting the packet based multi-stream information 108 and 110 via the single link 106 for the display 104, so that the display 104 is provided multi-stream information that includes temporal frame or field information suitable for usage by temporal image processing techniques. The process may continue until all the suitable field or frame information is sent as shown in block 206. As noted above, the method may include determining whether the display 104 has display mode capability to process temporal frame information provided as multi-stream information. The method may also include switching from a non-multi-stream capable mode to a multi-stream capable mode in response to determining that the display 104 has the display mode capability to process temporal frame information that is provided as multi-stream information.

Figure 3:
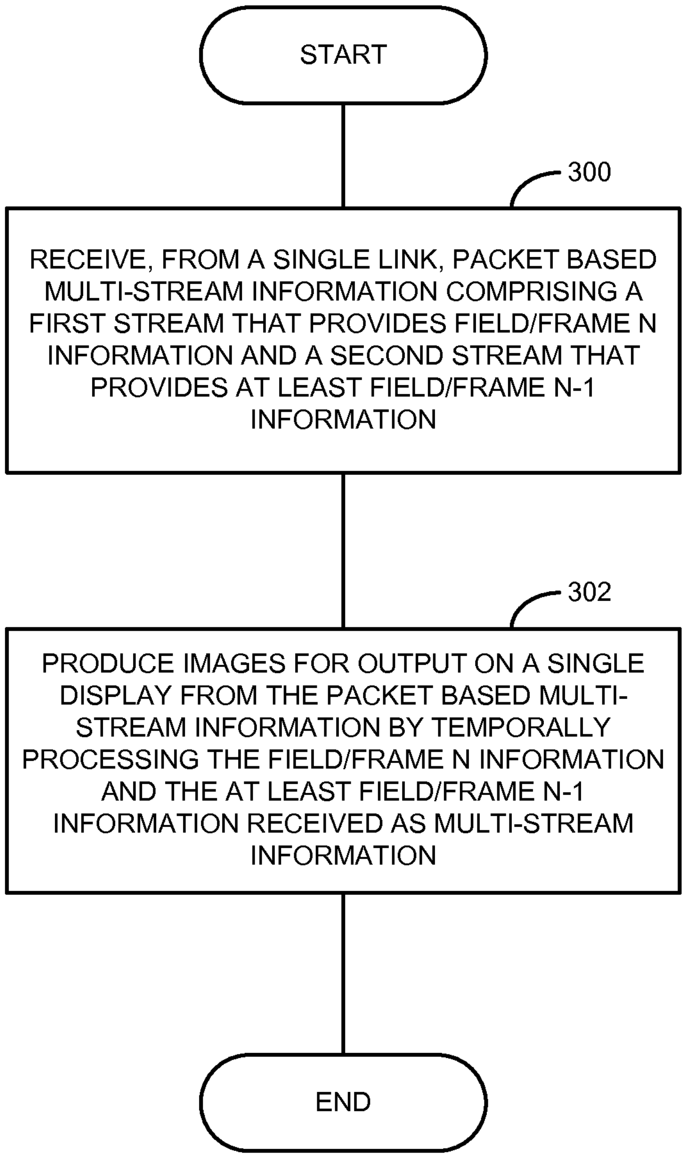
FIG. 3 is a flow chart illustrating one example of a method for providing temporal image processing in accordance with one example set forth in the disclosure.

Referring to FIG. 3, a method for providing video output on a display is illustrated that may be carried out, for example, by the display 104 or any other suitable structure. As shown in block 300, the method includes receiving, from a single link 106, packet based multi-stream information that includes a first stream that provides frame information 108 and at least a second stream that provides at least frame N−1 information. As shown in block 302, the method includes producing, for example, by the temporal image processor 130 or any other suitable logic, images for output on the display 104 and in particular, the display screen 132, from the packet based multi-stream information 108 and 110. The producing of the image is done by temporally processing the frame N information in the frame N−1 information received as multi-stream information 108 and 110 from the single link 106.

Figure 4:
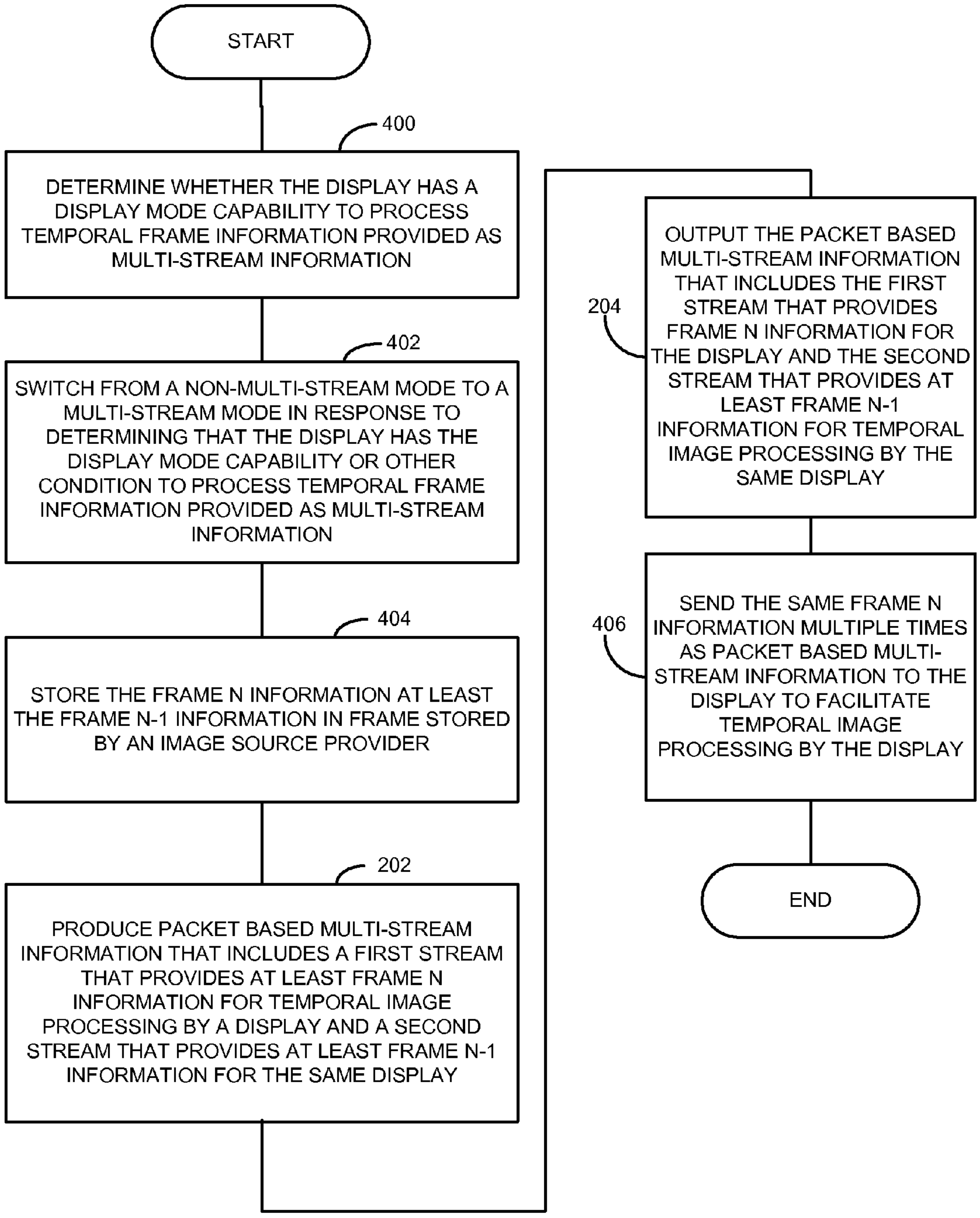
FIG. 4 is a flow chart illustrating in more detail one example of a method for providing temporal image processing in accordance with one example set forth in the disclosure.

FIG. 4 illustrates a method for providing temporal image processing in more detail. As shown in block 400, the method includes determining whether a display 104 has a display mode capability to process temporal frame information provided as multi-stream information via a single link. This may be performed, for example as noted above, via suitable communication with the display, via user input, or in any other suitable manner. As shown in block 402, if the display has the capability to process temporal frame information provided as multi-stream information, the image source device switches from a non-multi-stream mode, in this example, to a multi-stream mode in response to determining that the display has the display mode capability to process temporal image information from a multi-stream link. As shown in block 404, the method includes storing the frame N information in the multi-stream field/N−1 information for example in memory 116. As shown in block 202, the method includes producing the multi-stream temporal information for output to the display. The method may then proceed to block 204. The method also includes, as shown in block 406, sending the same frame N information multiple times as packet based multi-stream information to the display to facilitate temporal image processing if the display is capable of processing the repeated N information. This may be useful, for example as noted above, when the display that does not employ large field or frame stores. The process may then continue as desired until the mode is switched back to a non-temporal processing mode.

In operation, the sink device (the receiving unit or display) may declare itself as a DisplayPort (DP) branch device, or as a "composite sink" with multiple connected video sinks. Since these branch and sink elements are all within the same device, they will share a common "Container ID GUID". This allows the image sending device (source device) to recognize they all exist within the same physical unit, but the GUID alone does not help with understanding that this is a temporal processing capable display that is looking for multiple streams in parallel to enable temporal frame or field processing.

Either a manual or automated process (e.g., Plug & Play) may be used to allow the single receiving unit (display) to switch from a non temporal processing mode to a temporal processing mode. The sending device 102 packetizes the multiple temporal frame streams for the single receiving unit for the receiving unit to process the received multi-stream information. For the manual setup, the user independently configures the sender and receiver into a temporal processing display system using any suitable graphic user interface, physical remote control button etc. The multi-stream temporal frame encoder 118 packetizes the temporal frame N and N−1 information as multi-stream packets so that one stream has N frame information and another stream designated for the same display has N−1 frame information. Examples of such packets are described in section 2 of the Multi-stream Transport section of the DisplayPort 1.2 specification incorporated herein by reference. However, any suitable packet format may be used.

For auto configuration via Plug & Play, the method includes the source device understanding that multiple video sinks are all associated with a single display, and which sink is which component of the stream. This can be done via vender specific extensions to any of DPCD, EDID, DisplayID or MCCS. By way of example, the source initially enables a single video sink and enables a non temporal processing mode. The source device queries the abilities of the sink via DPCD, E-EDID, DID, MCCS, etc. protocols to determine if the sink device is capable of temporal processing. The source device discovers from the queries that the sink is capable of a temporal processing mode. Either right away or at some later point the source device decides to configure for the temporal processing mode. This may not happen initially as it might not be needed until a 3D game or application or movie is started by the source or based on some other condition as noted above. To enable temporal processing display, the source requests the sink to enable its additional sinks, which the sink does. The source knows which video sinks belong to the display device as they all share a common Container ID GUID. The source uses the Plug & Play information from the sink to determine which type of display information needs to be assigned to each stream number driven to the sink. For example stream 0 is N frame information and stream 1 is N−1 frame information. Other options are also possible. Once the sink device receives multiple streams of temporally related frame data in parallel it can temporally process information.

Among other advantages, a multi-stream approach is used for providing temporal frame information for temporal image processing. Also, the repeated sending of the frame allows the receiving display to avoid storing entire frames. In addition, multi-mode display functionality may be incorporated to allow dynamic mode changes between a display mode that utilizes temporal image processing and a mode that does not use temporal image processing. A type of plug and play mechanism may be employed so that when a display is linked with a frame sending device, that display mode indication information is provided by the display indicating the display mode capability so that the frame sending device may recognize that multi-stream temporal frame information should be sent over a single link to the display. Other advantages will be recognized by those of ordinary skill in the art.

As described above, a multi-streaming system such as DisplayPort, uses a single display interface to carry two or more display streams simultaneously. The disclosure extends the multi-streaming operation to simultaneously provide two or more temporally different frames of an image sequence to a system implementing temporal image processing. In one example, a given frame N may be transmitted over the display interface two or more times if desired which may be better than an alternative of storing the frames locally by the display that receives the temporal frames wherein the memory is local to the temporal image processor. Among other advantages, a device implementing temporal image processing may significantly reduce its memory requirements and may eliminate a need for external memory systems. This can result in lower cost, lower power consumption and smaller physical size. In one example, the image source may source the image sequence as multiple temporally different frames communicated at the same time over a single link. The image source device, in this example, should have a large enough memory to store the multiple temporal frames or fields.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method, carried out by an encoder, for providing temporal image processing comprising:

producing, by the encoder, for output on a single link, packet based multi-stream information by producing a sequence of temporally related frames and generating the packet based multi-stream information from the sequence, the packet based multi-stream information comprising a first stream that provides at least entire frame N information together with a second stream that provides at least entire frame N−1 information for temporal image processing by a same display, wherein N and N−1 information include entire frame information of temporally different frames from a same two-dimensional image sequence; and outputting, by the encoder, the packet based multi-stream information comprising the first stream that provides the at least entire frame N information together with the second stream that provides the at least entire frame N−1 information for temporal image processing by the same display.

2. The method of claim 1 comprising switching from a non-multi-stream capable mode to a multi-stream capable mode in response to determining that the display has a display mode capability to process temporal frame information provided as multi-stream information.

3. The method of claim 1 comprising sending the same frame N information multiple times as packet based multi-stream information to the display to facilitate temporal image processing by the display.

4. The method of claim 1 providing a user interface to select a multi-stream temporal frame information mode and switching from a non-multi-stream mode to a multi-stream mode in response to user input.

5. The method of claim 1 comprising switching between multi-stream mode and a non multi-stream mode based on at least one of: detection of a static screen condition, display content type and a power change condition.

6. The method of claim 1 comprising storing the at least entire frame N information and the at least entire frame N−1 information in frame stores by an image source provider.

7. A method, carried out by a display, for providing video output on a display comprising:

receiving, by the display, from a single link, packet based multi-stream information produced by a sequence of temporally related frames and generated from the sequence, the packet based multi-stream information comprising a first stream that provides at lease entire frame N information together with a second stream that provides at least entire frame N−1 information, wherein N and N−1 information include entire frame information of temporally different frames from a same two-dimensional image sequence; and producing, by the display, images for output on the display from the packet based multi-stream information by temporally processing the at least entire frame N information together with the at least entire frame N−1 information received as multi-stream information.

8. The method of claim 7 comprising storing the received first stream that provides the at least entire frame N information and the received second stream that provides the at least entire frame N−1 information in temporary sub-frame memory prior to producing the images and displaying the images on at least one display.

9. The method of claim 7 comprising receiving the same frame N information multiple times as repeated packet based multi-stream information and using the repeated packet based multi-stream information to perform temporal image processing by a display.

10. An apparatus for providing temporal image processing comprising:

logic operative to produce for output on a single link, packet based multi-stream information by producing a sequence of temporally related frames and generating the packet based multi-stream information from the sequence, the packet based multi-stream information comprising a first stream that provides at least entire frame N information together with a second stream that provides at least entire frame N−1 information for temporal image processing by a same display; and logic operative to output the packet based multi-stream information comprising the first stream that provides the at least entire frame N information together with the second stream that provides the at least entire frame N−1 information for temporal image processing by the same display, wherein N and N−1 information included entire frame information of temporally different frames from a same two-dimensional image sequence.

11. The apparatus of claim 10 comprising switching from a non-multi-stream capable mode to a multi-stream capable mode in response to determining that the display has a display mode capability to process temporal frame information provided as multi-stream information.

12. The apparatus of claim 10 comprising logic operative to send the same frame N information multiple times as packet based multi-stream information to the display to facilitate temporal image processing by the display.

13. The apparatus of claim 10 comprising logic operative to provide a user interface to select a multi-stream temporal frame information mode and switching from a non-multi-stream capable mode to a multi-stream capable mode in response to user input.

14. The apparatus of claim 10 comprising logic operative to switch between multi-stream mode and a non multi-stream mode based on at least one of: detection of a static screen condition, display content type and a power change condition.

15. The apparatus of claim 10 comprising memory that comprises the at least entire frame N information and the at least entire frame N−1 information.

16. An apparatus comprising:

logic operative to receive, from a single link, packet based multi-stream information produced by a sequence of temporally related frames and generated from the sequence, the packet based multi-stream information comprising a first stream that provides at least entire frame N information together with a second stream that provides at least entire frame N−1 information, and to produce images for output on a single display from the packet based multi-stream information by temporally processing the at least entire frame N information together with the at least entire frame N−1 information received as multi-stream information, wherein N and N−1 information include entire frame information of temporally different frames from a same two-dimensional image sequence.

17. The apparatus of claim 16 comprising a display that comprises the logic, the display operative to store the received the first stream that provides the at least entire frame N information and the second stream that provides the at least entire frame N−1 information in temporary sub-frame memory prior to producing the images and displaying the images on at least one display.

18. The apparatus of claim 16 wherein the logic is operative to receive the same frame N information multiple times as repeated packet based multi-stream information and use the repeated packet based multi-stream information to perform temporal image processing.

* * * * *